July 2, 1935.  G. V. KELLER, JR  2,006,951

VERTICAL SHAFT BEARING

Filed Oct. 7, 1933

Inventor:
George V. Keller Jr,
by Harry E. Dunham
His Attorney.

Patented July 2, 1935

2,006,951

UNITED STATES PATENT OFFICE 2,006,951

VERTICAL SHAFT BEARING

George V. Keller, Jr., Lynn, Mass., assignor to General Electric Company, a corporation of New York Application October 7, 1933, Serial No. 692,632

1 Claim. (Cl. 308—170)

The present invention relates to vertical shaft bearings, more particularly to arrangements in which a rotary shaft is vertically arranged and supported by lower and upper bearings.

The object of my invention is to provide an improved construction and arrangement of the type specified in which the bearings are efficiently lubricated.

For a consideration of what I consider to be novel and my invention, attention is directed to the following specification and the claim appended thereto in connection with the accompanying drawing which forms a part of my specification.

Figure 1:
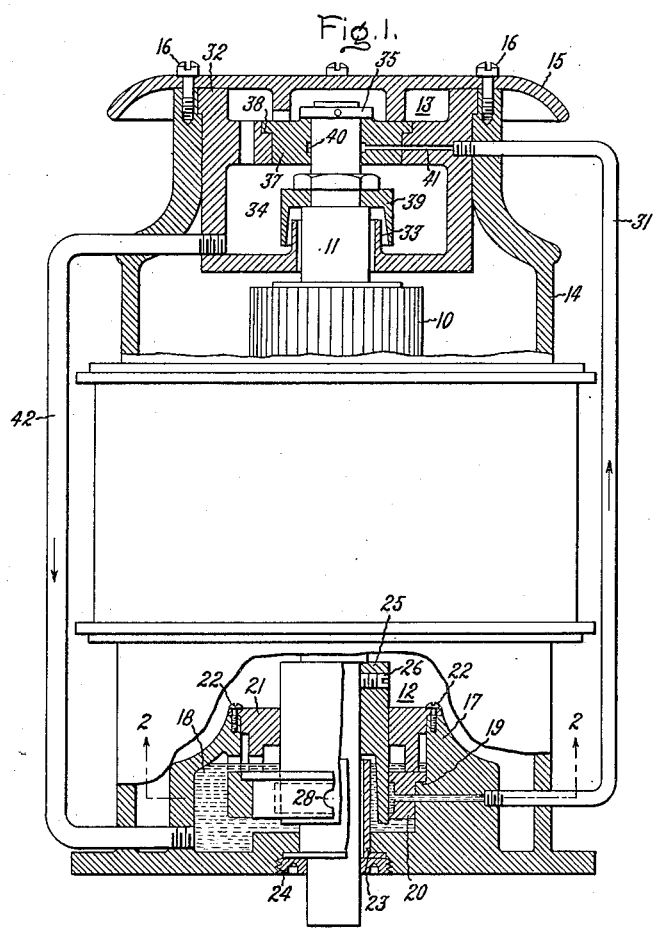
Figure 2:
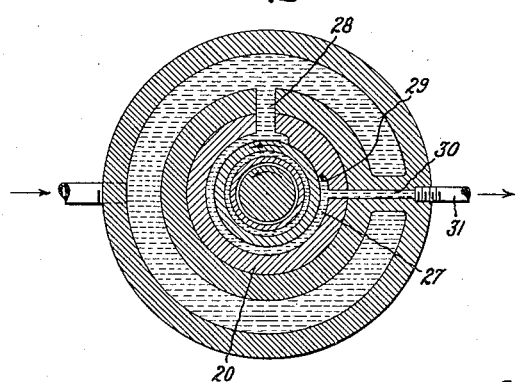

In the drawing, Fig. 1 illustrates a machine provided with bearings embodying my invention, and Fig. 2 is a cross-sectional view along line 2—2 of Fig. 1.

The machine shown by way of example is a dynamo electric machine comprising a rotor with a commutator 10 fastened to a vertically arranged shaft 11 rotatably supported in lower and upper bearing structures 12 and 13 respectively. The bearing structures are held in an outer casing 14 including a shield or cap 15 fastened to the casing by bolts 16 to completely enclose the machine. The arrangement so far described is well known in the art.

In accordance with my invention the lower casing portion is formed to define a chamber or compartment 17 for containing lubricant 18. The compartment has a recessed inner wall 19 defining a seat for a bearing 20. The latter is preferably made of bearing metal, or if desired provided with a lining of bearing metal. The bearing 20 is prevented from vertical movement by a sleeve 21 fastened to the upper wall of the compartment by screws 22 and defining a cover for the compartment 18. The inner wall of the compartment is defined by a stand-tube 23 inserted in a central bore of the lower casing portion and held in position by a nut 24. The bearing surface of bearing 20 engages a cap-shaped sleeve 25 which has an upper portion secured to the shaft by a set screw 26 and a lower portion concentrically arranged about and spaced from the stand-tube 23. The bearing 20 has a groove 27 cut into its surface. One end of the groove is connected to the outer region of the compartment through a bore 28; the other end of the groove defines a dam 29 and is connected through a channel 30 to a tube 31 projecting through the casing of the machine.

The upper bearing structure 13 comprises a tank 32 having an outer flanged portion seated in a recess of the casing and a flanged lower portion 33 defining a compartment 34. The shaft 11 projects through the flanged bottom portion 33 and has a reduced end portion provided with a collar 35 supported by a bearing member 37. The latter is seated in a recessed portion 38 of the tank 32. A cap or deflector 39 surrounding the flanged portion 33 is fastened to the reduced end portion of the shaft to prevent oil or like lubricant from leaking along the shaft into the machine. The bearing 37 has a bearing surface provided with a groove 40 connected through a channel 41 to the tube 31. The compartment 34 of the tank communication with the compartment 18 of the lower bearing structure through a conduit 42.

During operation, the lower shaft, together with the lower bearing act as a pump to force lubricant through the conduit 31 and the channel 41, into the upper bearing. The lubricant discharged from the upper bearing into the compartment 34 of the upper tank is returned to the compartment 18 through the conduit 42.

By my invention, I have accomplished an improved vertical shaft bearing arrangement in which a lower bearing, together with the shaft are immersed in oil or like lubricant and act as a pump for supplying lubricant to an upper bearing. The arrangement is particularly advantageous with regard to high speed engines in which the lubricant serves not only as a means for lubricating the bearing, but also for cooling it. In high speed machines a steady flow of lubricant through the bearing is necessary. This is readily obtained with the arrangement according to my invention.

Having described my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

In an engine having a casing and a vertically arranged rotatable shaft, a compartment for lubricant defined by the casing surrounding a lower portion of the shaft, a single friction bearing for the lower portion of the shaft fastened to the inner wall of the compartment, the bearing surface having a circumferentially extending groove defining a dam, one end of the groove receiving lubricant from the compartment through a radial bore in the bearing, a conduit connected to the bearing to receive lubricant from the other end of said groove by the pumping action of the shaft in the bearing, and another bearing for an upper portion of the shaft connected to the conduit to receive lubricant.

GEORGE V. KELLER, Jr.